Jan. 21, 1969

T. WOLF 3,422,566

MINIATURE RINGING AND TALKING TELEPHONE

Filed March 29, 1965

INVENTOR

Tobin Wolf

BY Jay M. Cantor

ATTORNEY

United States Patent Office 3,422,566

Patented Jan. 21, 1969

3,422,566
MINIATURE RINGING AND TALKING TELEPHONE

Tobin Wolf, 447 Essex Ave., Bloomfield, N.J. 07003

Filed Mar. 29, 1965, Ser. No. 443,407
U.S. Cl. 46—33 17 Claims
Int. Cl. A63h *33/03, 33/26;* G11b *3/00*

ABSTRACT OF THE DISCLOSURE

A toy comprising a casing for supporting a telephone in two zones thereon. In one zone a magnet carried by the telephone raises a lever to close a switch and ring a bell. Raising the lever also releases the tone arm of a phonograph mounted in the casing for closing a second switch to operate the motor of the phonograph. Movement of the phone to a second zone allows the lever to drop under the influence of gravity to open the circuit to the bell and to engage a record carried by the lever and a needle carried by the tone arm to play the recording.

This invention relates to a toy telephone and more specifically to a toy telephone capable of automatically ringing by placing the telephone at a predetermined location and disconnecting the ringing circuit and operating an audible message unit by removing the telephone from the predetermined location.

Toy telephones of various types have been well known in the prior art. Such toy telephones of the prior art are found with various degrees of complexity and, therefore, the prior art toy telephones have been suited for children of all age levels. However, the prior art toy telephones having any degree of sophistication have always been relatively expensive to manufacture. Furthermore, the prior art toy telephones have not truly paralleled the operation of the standard home telephone unit despite the fact that children wish to copy their elders and would be more receptive to a toy telephone which closely paralleled the standard home telephone unit.

A toy telephone which is capable of automatically ringing or providing a signal merely by placing the telephone at a predetermined location and which is capable of providing an audible message when the telephone is again moved would closely parallel the operation of the home telephone unit. Telephones having such property have not been known to the prior art and would provide an interesting and unique toy for children.

Briefly, a toy telephone of the type set forth above is provided by placing a magnet in a toy telephone. A first electric circuit including a normally open switch, a signal device and a battery is then secured beneath a table top or the like, the switch comprising a pair of contacts, one of the contacts being attached to a support for a magnetically attractable material. Placing of the magnet in the telephone on the surface of the table above the magnetically attractable material will cause an upward movement of the one contact to close the switch, thereby energizing a signal device such as a bell. Movement of the telephone a sufficient distance from the magnetically attractable material to provide an insufficient magnetic field about the material for maintaining the switch closed will allow the support and therefore the one contact to drop and open the circuit, thereby shutting off the bell. The downward movement of the support simultaneously-closes a second switch and thereby energizes a motor circuit and operates a phonograph turntable. When the support returns to its lowered position, a phonograph needle or stylus is placed in contact with the groove of a record secured to the turntable. The needle or stylus will then reproduce the contents of the record groove as the record rotates. When the stylus reaches the inner portion of the record, the second switch is opened and the motor for rotating the turntable is turned off.

It is an object of this invention to provide a toy telephone capable of providing a signal by appropriate positioning thereof.

It is a further object of this invention to provide a toy telephone capable of ringing a bell by appropriate positioning thereof.

It is a still further object of this invention to provide a toy telephone wherein proper spatial positioning of the telephone will operate a switch to cause ringing of a bell and removal of the telephone will cause the reproduction of an audible message.

It is a yet further object of this invention to provide a toy telephone wherein proper positioning of the telephone operates a magnetically actuated switch to close a circuit and operate a signal.

It is a yet further object of this invention to provide a magnetically operated ringing and message reproducing toy telephone of low cost and durability.

The above objects and still further objects of this invention will become apparent to those skilled in the art from a consideration of the spectification and accompanying drawing of a preferred embodiment of the invention which is provided by way of example and not by way of limitation, wherein.

Figure 1:
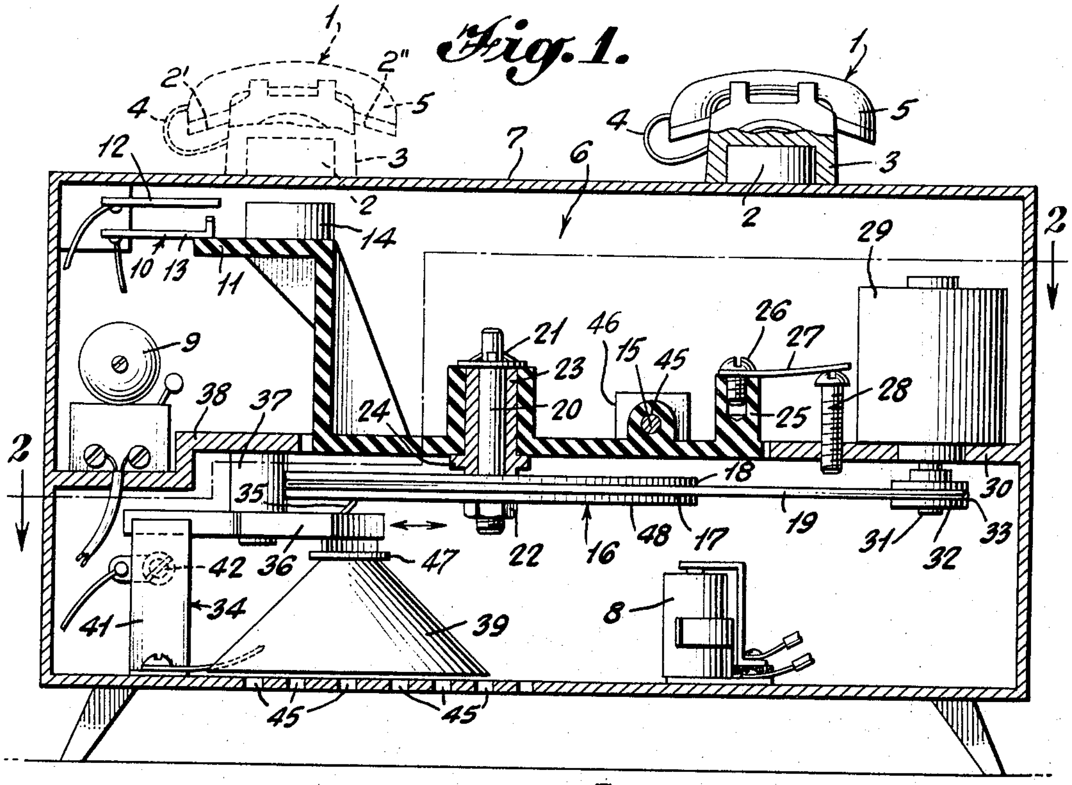
FIGURE 1 is a side view of a preferred embodiment of the invention in cross section.
Figure 2:
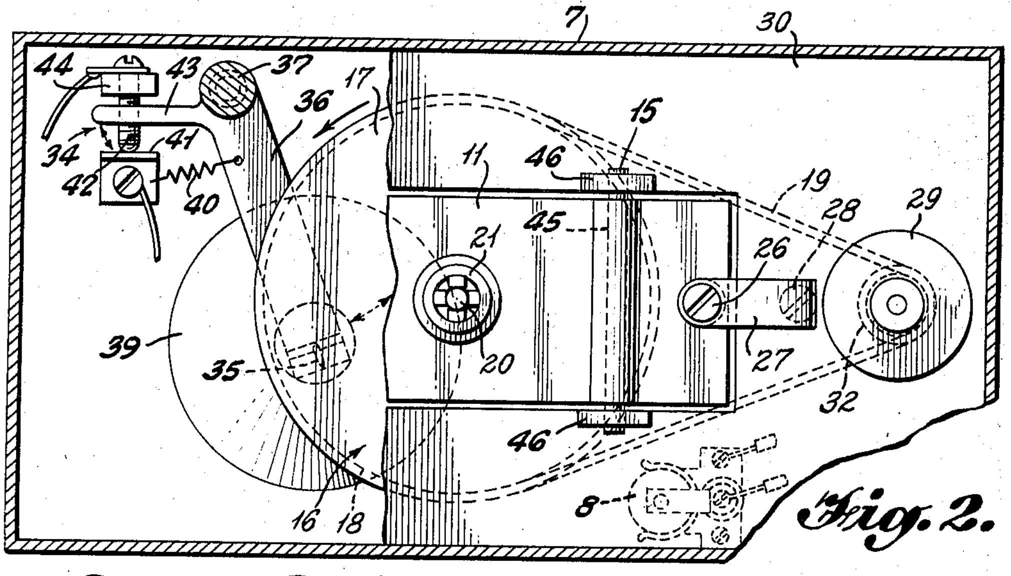
FIGURE 2 is a view taken along the line 2—2 of FIGURE 1.

FIGURES 1 and 2 set forth a preferred embodiment of the invention, wherein a toy telephone 1 is shown which includes a base portion 3 having a magnet 2 imbedded or secured therein. The telephone also includes a receiver 5 and a cord 4 attaching the receiver to the base 3.

There is further provided a cabinet or the like 7 within which is secured the electrical signalling and sound reproducing equipment 6. Although the invention is described with reference to a cabinet, it should be understood that the electrical signalling circuitry could be secured to any body, it merely being preferable that the top surface of the body be flat for placement of the telephone thereon. It is also desirable that the electrical signalling and sound reproducing equipment 6 be hidden from view to provide a "magic" quality to the toy.

Figure 3:
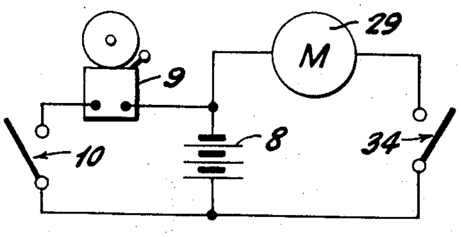
FIGURE 3 is a schematic diagram of a typical bell ringing system.

The electrical signalling circuitry (FIGURE 3) includes a battery 8 coupled to a signalling device 9 which is shown in the preferred embodiment as a bell. The bell is coupled to a switch 10 which includes a contact member 13 resting on a molded arm 11 composed of insulating material and a contact member 12. A block of magnetically attractable material 14 is secured to the upper portion of the molded arm 11. The bell 9, battery 8 and switch 10 are connected in series to form a circuit as shown in FIGURE 3. The interconnections are not shown in FIGURE 1. The electrical signalling circuitry is secured to the cabinet 7 in a conventional manner.

The molded insulated arm 11 is free to pivot on a hinge pin 15, passing through an aperture 45 therein and secured to the cabinet shelf 30 by means of elements 46 which are upstanding integral lugs or ears on cabinet portion 30 in which hinge pin 15 is journaled. The arm 11 also carries the turntable assembly 16. The turntable assembly includes a turntable 17 having a groove 18 in the outer periphery thereof for receiving a belt 19. The turntable assembly 16 is secured to the arm 11 by means of a threaded shaft 20 having a head member 21 and a bolt 22 which passes through a bearing 23 supported in an aperture in the arm at the center of the turntable. A portion 24 of the bearing 23 extends below and flush with the underportion of the arm 11 to provide a spacer between the arm and the turntable and to prevent movement of the turntable along the shaft 20. A record 48 is secured to the underside of the turntable.

The molded insulated arm 11 also includes a screw receiving portion 25 to receive a screw 26 for securing the spring member 27 thereto. The spring member abuts the head of an adjusting screw 28 which is secured in a portion 30 of the cabinet 7 to control the clockwise rotation of the arm 11 and control the stylus pressure against the record 48. This stylus pressure can be adjusted by altering the height of the adjusting screw 28.

A motor 29 is secured in the extension 30 of the cabinet 7, the motor including a shaft 31. A disc 32 is secured to the end of the shaft 31, the disc including a groove 33 at the outer periphery thereof for receiving the belt 19. The motor is connected through a switch 34 to the battery (see FIGURE 3).

A stylus member 35 is positioned on a tone arm 36 which is pivotally connected by a hinge pin or the like 37 to an extension 38 of the cabinet 7. Modulations detected by the stylus 35 and tone arm 36 are transmitted to a speaker cone 39 secured to the cabinet 7. The heel end of the stylus 35 moves across a plastic disk fastened to the apex of the cone 39, thereby transmitting vibrations from the record to the cone. The tone arm 36 is coupled to a spring 40 to provide a clockwise biasing force (FIGURE 2).

The switch 34 is composed of a leaf contact 41 and an adjusting screw 42. This switch is operated by the finger 43 extending from the tone arm 36 whereby a clockwise rotation of the tone arm will provide a clockwise rotation of the finger and allow the leaf contact 41 to engage the contact screw 42 and close switch 34. Rotation of the tone arm in the counter-clockwise direction will, on the other hand, open the switch. The degree of counter-clockwise rotation of the finger 43 is determined by the setting of the adjustment screw contact member 42 on fixed support member 44 mounted on the base.

The toy telephone system operates in the following manner:

When the telephone 1 is repositioned to the location of the telephone 1 shown in phantom (FIGURE 1), the magnet 2 in the base of the telephone will attract the magnet or magnetically attractable material 14 positioned on the arm 11. Accordingly, the arm 11 will pivot about the pivot or hinge pin 15 in a clockwise direction and cause the contact members 12 and 13 to engage, thereby closing switch 10. Closing of switch 10 completes the circuit composed of the battery 8, the bell 9 and the switch 10 and causes the bell to ring.

The upward or clockwise movement of the arm 11 also allows the stylus 35 to become disengaged from the record 48 which is either formed as a part of the turntable 17 or which can be a normal record of either continuous or random groove secured to the underside of the turntable adjacent the stylus 35. The tone arm 36 is now free to pivot about the pivot or hinge pin 37 and therefore moves in a clockwise direction (FIGURE 2) due to the bias provided by the bias spring 40. This clockwise movement continues until the stylus is positioned at the outer periphery of the record 48, this positioning of the stylus being controlled by the position of the member 44. The clockwise rotation of the tone arm 36 allows the leaf contact 41 to engage the screw contact 42 and close the switch 34, thereby turning on the motor 29 and causing the turntable to rotate.

When the telephone member is removed from the position indicated in phantom in FIGURE 1 to a position sufficiently out of the magnetic field of the magnet 14, the arm 11 will rotate in a counter-clockwise direction about the hinge pin 15 due to the force of gravity and open the switch 10, thereby turning off the bell. The counter-clockwise movement of the arm 11 causes the stylus 35 to engage a groove at the outer edge of the record 48 and travel within this groove toward the center of the record. The modulations or vibrations picked up by the stylus are transmitted directly to the speaker cone 39 and the cone vibrations, which form the audible sounds, are transmitted through the cabinet enclosure 7 via the ports 45 positioned therein.

When the stylus reaches the center of the record, the arm 36 and finger 43 will have been moving likewise in the counter-clockwise direction. The finger 43 will finally contact the leaf contact 41 and cause this contact to be disengaged from the screw contact 42, thereby opening the switch 34 and shutting off the motor 29. The system will then have operated through its entire cycle of operation and be prepared for another cycle of operation when the telephone 1 is again placed over the magnet 14.

Although a simple bar-type magnet has been described in the telephone 1, it should be understood that many other configurations could be used. For example, two separate magnets, each with the same pole extending in the downward direction, could be used with one such magnet being placed in the ear piece of the telephone and the other magnet being placed in the mouth piece such as indicated at 2′ and 2″. This arrangement would provide the advantage that the telephone would not have to be moved to provide the audible sound from the record. The mere lifting of the receiver would allow the arm 11 to travel in the counter-clockwise direction and cause the system to operate as described hereinabove. It is also clear that, though the invention has been described with respect to a telephone, other uses would be obvious and fall within the scope of the invention.

Although the invention has been described with respect to a specific preferred embodiment, many other embodiments, alterations and modifications will immediately become apparent to those skilled in the art. It is therefore the intention that the appended claims be interpreted as broadly as possible in view of the prior art to encompass all such embodiments, alterations and modifications.

What is claimed is:

1. In combination, a portable toy telephone, a magnet positioned in said telephone, means remote from said telephone responsive to a predetermined magnetic field strength from said magnet for providing a signal and means responsive to the subsequent removal of said predetermined magnetic field for initiating the operation of an audible device.

2. A combination as set forth in claim 1, wherein said signal is a bell.

3. A combination as set forth in claim 1, wherein said audible device is a phonograph.

4. A combination as set forth in claim 2, wherein said audible device is a phonograph.

5. A toy comprising a simulated telephone, a casing for supporting said telephone in two zones, cooperative magnetic means in said casing and telephone responsive to the positioning of at least a portion of said telephone into one of said zones for producing an alarm signal, and means responsive to the positioning of at least a portion of said telephone into the other of said zones for extinguishing said signal and producing an audible message.

6. A device as defined in claim 5 wherein the means for producing the alarm signal is a bell.

7. A device as defined in claim 5 wherein the first mentioned means comprises a magnet carried by the telephone and a magnetic material within the casing mounted for movement to close a switch.

8. A device as defined in claim 7 wherein the telephone comprises a receiver and a base and the magnet is carried in the base.

9. A device as defined in claim 7 wherein the telephone comprises a receiver and a base and the magnet is carried in the receiver.

10. A device as defined by claim 9 wherein the magnet is a permanent magnet.

11. A device as defined in claim 7 wherein the magnetic material is mounted on a lever, and a movable element of a switch is secured to the lever for engagement with another element of a switch when the magnet is positioned in the said one of said zones.

12. A device as defined in claim 11 wherein a turntable is carried by the lever, motor means mounted in the casing for rotating said turntable, and the means for producing the audible message comprises a sound track carried by the turntable.

13. A device as defined in claim 12 wherein the means for producing the audible message comprises a tone arm pivotally mounted in the casing and means carried by the arm for closing a second switch to energize the motor means when the telephone is moved into the first of said zones.

14. A device as defined in claim 13 wherein the tone arm carries a stylus and the movement of the telephone into the second zone lowers the sound track into contact with the stylus.

15. A device as defined in claim 14 further including means for opening the second switch when the playing of the sound track has been completed.

16. A device as defined in claim 14 further including means for adjusting the pressure of the sound track against the stylus.

17. A device as defined in claim 16 wherein the adjusting means comprises a spring secured to the lever and an adjusting screw fixedly mounted in the casing and supporting the spring.

References Cited

UNITED STATES PATENTS

| | | | |
|---|---|---|---|
| 2,121,235 | 6/1938 | Hunciker | 335—205 XR |
| 2,393,272 | 1/1946 | Van Deventer. | |
| 2,658,107 | 11/1953 | Zimmerman. | |
| 2,769,860 | 11/1956 | Zimmerman | 179—6 |
| 2,927,794 | 3/1960 | Carson | 274—9.2 |
| 3,187,127 | 6/1965 | Hess | 200—61.41 |
| 2,673,252 | 3/1954 | Henrikson | 200—157 |
| 2,505,626 | 4/1950 | Palmer | 46—236 XR |
| 2,749,663 | 6/1956 | Lemelson | 46—236 |
| 3,232,004 | 2/1966 | Felsher | 46—236 XR |
| 3,239,961 | 3/1966 | Forkner | 46—241 XR |
| 3,266,187 | 8/1966 | Felsher | 46—239 |
| 3,287,020 | 11/1966 | Beebe | 46—232 XR |

LOUIS G. MANCENE, *Primary Examiner.*

SETH NATTER, *Assistant Examiner.*

U.S. Cl. X.R.

46—232, 239; 274—9